（12）United States Patent
Wilkerson et al.

(10) Patent No.: US 8,977,738 B2
(45) Date of Patent: Mar. 10, 2015

(54) AUTOMATED DISCOVERY OF MONITORING DEVICES ON A NETWORK

(75) Inventors: Patrick Wilkerson, Victoria (CA); John C. Van Gorp, Sidney (CA)

(73) Assignee: Power Measurement Ltd., Saanichton, British Columbia (CA)

( * ) Notice: Subject to any disclaimer, the term of this patent is extended or adjusted under 35 U.S.C. 154(b) by 1152 days.

(21) Appl. No.: 12/479,265

(22) Filed: Jun. 5, 2009

(65) Prior Publication Data

US 2010/0312875 A1     Dec. 9, 2010

(51) Int. Cl.
*G06F 15/173*   (2006.01)
*H04L 29/12*    (2006.01)
*G06F 15/177*   (2006.01)

(52) U.S. Cl.
CPC ...... *H04L 61/1511* (2013.01); *H04L 29/12066* (2013.01); *H04L 61/2015* (2013.01)
USPC ............................ 709/224; 709/220; 709/222

(58) Field of Classification Search
USPC ......................................................... 709/224
See application file for complete search history.

(56) References Cited

U.S. PATENT DOCUMENTS

| 7,340,512 | B2 * | 3/2008 | Cochran et al. | 709/220 |
| 2005/0010866 | A1 * | 1/2005 | Humpleman et al. | 715/513 |
| 2005/0163118 | A1 * | 7/2005 | Steindl | 370/389 |

OTHER PUBLICATIONS

Domain Name System, *Wikipedia, the free encyclopedia*, http://en.wikipedia.org/w/index.php?title=Domain_Name_System, May 13, 2009, 17 pgs.
Dynamic Host Configuration Protocol, *Wikipedia, the free encyclopedia*, http://en.wikipedia.org/w/index.php?title=Dynamic_Host_Configuration, May 13, 2009, 6 pgs.
System I, Networking Dynamic Host Confirmation Protocol, *IBM*, Version 5 Release 4, Fifth Edition (Feb. 2006), © Copyright International Business Machines Corporation 1998, 2006, 66 pgs.
Eserver iSeries DNS, *IBM*, Version 5 Release 3, Fifth Edition (Feb. 2005), © Copyright International Business Machines Corporation 1998, 2005, 46 pgs.
Using DNS servers with DHCP, *Microsoft TechNet*, http://technet.microsoft.com/en-us/libary/cc787034(printer).aspx, May 13, 2009, 6 pgs.
DNS zone transfer, *Wikipedia, the free encyclopedia*, http://en.wikipedia.org/w/index.php?title=DNS_zone, May 13, 2009, 6 pgs.

* cited by examiner

*Primary Examiner* — Hee Soo Kim
(74) *Attorney, Agent, or Firm* — Brinks Gilson & Lione

(57) ABSTRACT

A system and method are disclosed for the automated discovery of devices on a network, such as a TCP/IP network using Dynamic Host Configuration Protocol ("DHCP") and Domain Name System ("DNS") servers. Devices on the network may be discovered, identified, and tracked by a monitoring server. Communications with the monitoring server may include identification information for each device. The identification information may be stored in DHCP option fields, transmitted with DHCP messages, and used to identify whether the device is new to the network.

14 Claims, 4 Drawing Sheets

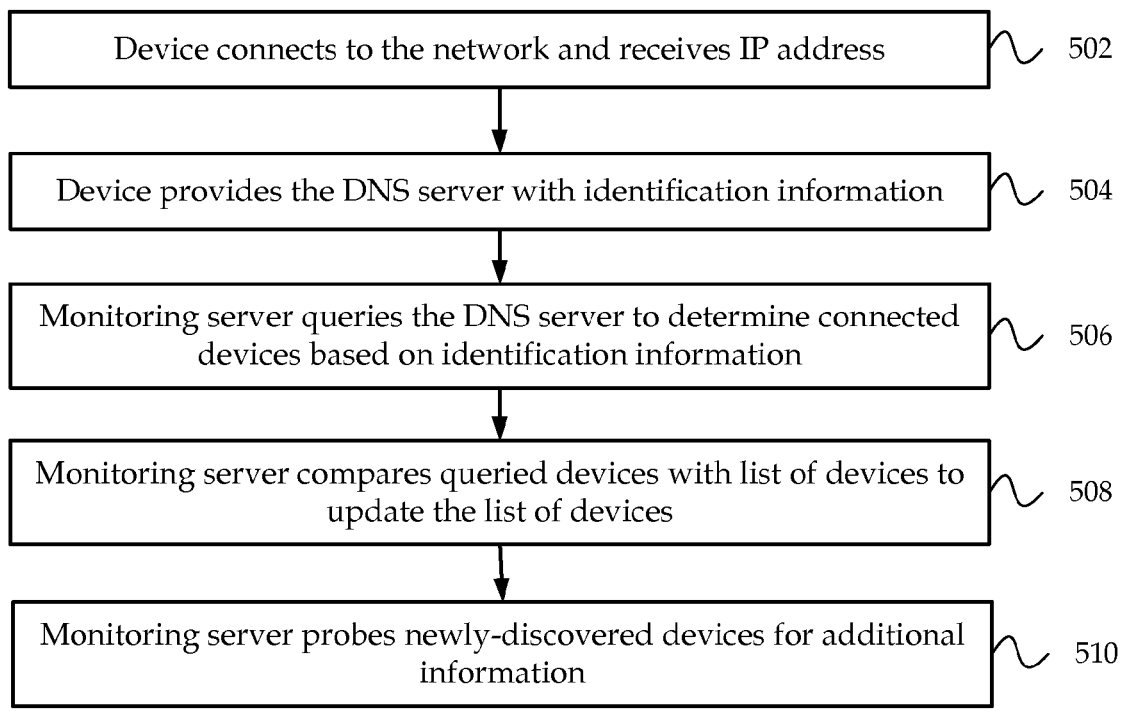

AUTOMATED DISCOVERY OF MONITORING DEVICES ON A NETWORK

BACKGROUND

As network demands have increased, the management of devices connected in a network has grown more complex. For example, managing devices on an Ethernet network can be a complex and time consuming task. A network using dynamic allocation of internet protocol ("IP") addresses for devices may result in difficulties in discovering, identifying, and managing those devices because of the changes to the address. In addition, manual tracking and management of IP addresses assigned to certain devices with static IP addresses may be difficult to coordinate with devices using a dynamic address pool.

Devices may be configured to use the Dynamic Host Configuration Protocol ("DHCP") to receive an IP address when connected to a network, but monitoring of the devices may require reading the assigned address on a local display and manually recording the address. Reassignment of IP addresses or an expiration of an existing IP address may result in a loss of communications with the device until the device's new IP address is obtained. It may be beneficial to improve the monitoring and discovery of devices in a network.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 5 is an alternative process for automatically discovering devices on a network.

DETAILED DESCRIPTION

By way of introduction, the embodiments described below include a system and method for automated discovery of devices on a network. In particular, devices on a TCP/IP network may be identified and tracked. A monitoring server may discover devices using Dynamic Host Configuration Protocol ("DHCP") and Domain Name System ("DNS") servers. Devices may acquire an Internet Protocol ("IP") address and the monitoring server may automatically discover the devices added to the network, as well as recognizing when an IP address changes.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments.

Figure 1:
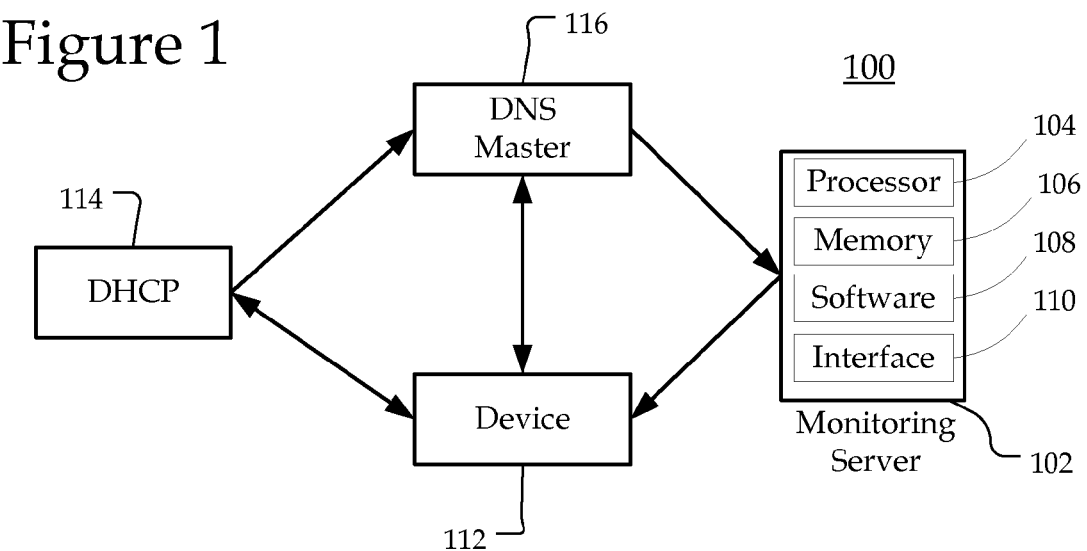
FIG. 1 is an exemplary network management system.

FIG. 1 is an exemplary network management system 100. The network management system 100 includes a monitoring server 102, one or more devices 112, a DHCP server 114, and a DNS master 116. The DNS master 116 may also be referred to as a master DNS server. The monitoring server 102 may operate to monitor or track the devices, such as the device 112, that are added to or existing on the network. Although not explicitly shown, each of the components in the system 100 may be coupled through one or more networks.

The network(s) that may connect any of the components in the network management system 100 to enable communication of data between the components and devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network may be a public network, such as the Internet, a private network, such as an intranet, or combinations thereof, and may utilize a variety of networking protocols now available or later developed including, but not limited to TCP/IP or other IP based networking protocols. The network may include one or more of a local area network (LAN), a wide area network (WAN), a direct connection such as through a Universal Serial Bus (USB) port, and the like, and may include the set of interconnected networks that make up the Internet. The network may include any communication method or employ any form of machine-readable media for communicating information from one device to another.

The DHCP 114 is a server that allows for the configuration and identification of devices in an Internet Protocol ("IP") network. There may be multiple DHCP servers in a given network as illustrated and described with respect to FIG. 2. The DHCP server 114 may receive additional information about devices on the network (such as the device 112) that can be used by the monitoring server 102 for tracking and monitoring the devices that are connected to the network. In one embodiment, the DHCP server 114 may be referred to as a dynamic network address assignment server and be configured to allow for the configuration and identification of devices in any network.

DHCP is a network application protocol that may automate network parameter assignment to devices, such as the device 112. New devices that are added to the network are assigned identification information by one of the DHCP servers. When the device 112 is connected to the network, it requests information from the DHCP server 114. The DHCP server 114 may manage a pool of IP addresses, as well as other information and configuration parameters for each device connected in the network, such as the device 112. The DHCP server 114 can assign an IP address to the device 112. The IP assignment may be based on a lease in which the IP address is valid for a certain length of time. The lease may include an assignment of other IP parameters, such as a subnet mask and default gateway. During the lease, the IP address cannot be assigned to other devices. When the lease expires, the device can request a new lease and that IP address is available to other devices. Alternatively, the device may renew the lease prior to expiration.

The DHCP server 114 assigns an IP address to the device 112 before the device 112 communicates over the network. The DHCP server may allocate IP addresses through dynamic allocation, automatic allocation, static allocation, manual allocation, or autoconfiguration. DHCP operations may include IP discovery, IP lease offer, IP request, and IP lease acknowledgement, which are further described with respect to FIG. 3. The discovery may include a DHCPDISCOVER command by which the device can broadcast to find available servers and for receiving an IP address from one of the available servers. A lease offer may include a DHCPOFFER command in which the DHCP server 114 reserves an IP address and offers an IP lease to the device 112. The offer may include additional configuration information or options that may be sent to the device in addition to the IP address includes a subnet mask, domain name, router IP addresses, domain name server IP addresses, and static routes. The request may include a DHCPREQUEST command by which the device 112 requests an IP address based on the offer from the DHCP server 114. The acknowledgement may include a DHCPACK command by which the DHCP server 114 acknowledges receiving the request for the IP address. The acknowledgement may include the lease duration and other configuration information. DHCP operation is further described in "Networking Dynamic Host Configuration Protocol," IBM System i, Version 5 Release 4, published in February 2006, and hereby incorporated by reference.

When an IP address is assigned to the device 112, the DNS master 116 is updated to associate a host or domain name with the device 112. The DNS master 116 comprises a computing device, such as a server, that provides a domain name (a.k.a. host name) to devices connected through the network. The DNS master 116 may be one or more name servers. In an alternative embodiment, the DNS master 116 may be referred to as a device address translator and may be configured to translate a machine comprehensible address for a device into a human comprehensible address. The human comprehensible address may be a host name or domain name. In the case of a DNS address translator, the machine comprehensible address corresponds to an IP address as discussed below.

The domain name system ("DNS") translates the numerical identifiers (e.g. IP addresses) into human readable domain names. In particular, DNS is a distributed database system for managing host names and the IP addresses associated with those host names. One server may maintain the host names and associated IP addresses for a subset or zone. A zone may be a portion or sub domain from a particular domain. A single domain may comprise multiple zones for all of its host names and associated IP addresses. There may be a single server for each zone, or a server may be responsible for multiple domains and/or zones. A DNS server that has host information and data for a particular zone is considered authoritative for the zone and can respond to queries about the domains/hosts in its zone.

DNS may be used to assign a unique Fully Qualified Domain Name (FQDN) to devices on a network. As an example, a device may have a host name of SN12345 and a FQDN of SN12345.company.com. Once the monitoring server has discovered a device on the network, it may map the FQDN of the device to an internal naming structure used to reference the device. Alternatively, the monitoring server may simply use the FQDN as the primary reference for the device.

DNS resource records may record the mapping of IP addresses, domain names, and the devices associated with them. The resource records may provide the IP address assigned to a particular domain name when the DNS server receives a query from another source. DNS organization, queries, and resource records are further described in "DNS," IBM eserver iSeries, Version 5 Release 3, published in August 2005, and which is hereby incorporated by reference.

The DHCP server may be configured to send update requests to the DNS server whenever a new address is assigned. When a device using DHCP receives an IP address, that data may be sent to the DNS server. DHCP may be configured to update the resource records for the DNS system. When a device's address changes, DHCP can automatically send an update to the DNS server so that device can be located at its new IP address. The device identification information may be sent to the DNS server and stored in the resource records.

The device 112 may be a computing device that connects with a network. Examples of a user device include, but are not limited to, a personal computer, personal digital assistant ("PDA"), cellular phone, or other electronic device. In one embodiment, the device 112 may be a monitoring device, such as an intelligent electronic device ("IED") or a power meter. Exemplary IED devices 112 include programmable logic controllers ("PLC's"), Remote Terminal Units ("RTU's"), electric/watt hour meters, protection relays and fault recorders as described below. The IED's may make use of memory and microprocessors to provide increased versatility and additional functionality. Such functionality includes the ability to communicate with remote computing systems, either via a direct connection, e.g. modem or via a network, such as the network system 100. For more detailed information regarding IED's capable of network communication, please refer to U.S. Pat. No. 6,961,641, entitled "INTRA-DEVICE COMMUNICATIONS ARCHITECTURE FOR MANAGING ELECTRICAL POWER DISTRIBUTION AND CONSUMPTION", U.S. Pat. No. 6,751,562, entitled "COMMUNICATIONS ARCHITECTURE FOR INTELLIGENT ELECTRONIC DEVICES", and U.S. Pat. No. 7,216,043, entitled "PUSH COMMUNICATIONS ARCHITECTURE FOR INTELLIGENT ELECTRONIC DEVICES," each of which is hereby incorporated by reference.

IED's such as Programmable Logic Controllers ("PLC's"), Remote Terminal Units ("RTU's"), electric power meters, protective relays, fault recorders and other devices are coupled with power distribution networks to manage and control the distribution and consumption of electrical power. Such devices typically utilize memory and microprocessors executing software to implement the desired power management function. IED's include on-site devices coupled with particular loads or portions of an electrical power distribution system and are used to monitor and manage power generation, distribution and consumption. IED's may also be referred to as power management devices ("PMD's").

Although not shown, there may be multiple devices in addition to the device 112, present in the network system 100. Each device may be assigned a different IP address from the DHCP server 114 and assigned a different host name from the DNS master 116. The devices may be connected over a network, such as the Internet or an Intranet, with the other components of the network system 100.

The device 112 and the DNS master 116 may be coupled with the monitoring server 102. The monitoring server 102 and the DHCP server 114 may be a single component. The monitoring server 102 may automatically discover when new devices, such as the device 112, are added to the network. The discovery and identification of devices on the network by the monitoring server 102 is further described with respect to FIG. 3 discussed below. The monitoring server 102 may include a processor 104, memory 106, software 108 and an interface 110.

The processor 104 in the monitoring server 102 may include a central processing unit (CPU), a graphics processing unit (GPU), a digital signal processor (DSP) or other type of processing device. The processor 104 may be one or more general processors, digital signal processors, application specific integrated circuits, field programmable gate arrays, servers, networks, digital circuits, analog circuits, combinations thereof, or other now known or later developed devices for analyzing and processing data. The processor 104 may operate in conjunction with a software program, such as code generated manually (i.e., programmed).

The processor 104 may be coupled with a memory 106, or the memory 106 may be a separate component. The interface 110 and/or the software 108 may be stored in the memory 106. The memory 106 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 106 may include a random access memory for the processor 104. Alternatively, the memory 106 may be separate from the processor 104, such as a cache memory of a processor, the system memory, or other memory. The memory 106 may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store ad or user data. The memory 106 is operable to store instructions executable by the processor 104. The functions, acts or tasks illustrated in the figures or described herein may be performed by the programmed processor executing the instructions stored in the memory 106. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like. The processor 104 is configured to execute the software 108.

The interface 110 may allow for communication with the device 112, the DHCP server 114, and/or the DNS master 116. In one embodiment, the interface 110 may include a user interface configured to allow a user and/or administrator to interact with and configure the monitoring server 102. Accordingly, the interface 110 may include a keyboard, keypad or a cursor control device, such as a mouse, or a joystick, touch screen display, remote control or any other device operative to interact with the monitoring server 102. The interface 110 may include a display coupled with the processor 104 and configured to display an output from the processor 104. The display may act as an interface for the user to see the functioning of the processor 104, or as an interface with the software 108 for providing input parameters As described below with respect to FIG. 3, the monitoring server 102 acts as a DNS slave that manages a domain name zone for certain devices on the network. The monitoring server 102 automatically learns of devices that are added to or removed from the network based on the identification information that it receives from each device. The identification information may be located in a DHCP option field, such as the option 12 (host name) field or in the vender specific option (VSO) field. This information allows the monitoring server 102 to track which devices are located on the network and to identify when a device is removed and when a device is added to the network. The identification information provided from the DHCP server may be different than the identification information used to identify devices.

When devices are added to the network, they are assigned an IP address that is associated with a name within a specific domain name zone (such as company.com). When the monitoring server is first configured to find devices attached to the network, it initiates a zone transfer from the DNS master server for the domain name zone associated with the devices attached to the network. The monitoring server may then initiate an incremental zone transfer when notified of changes on the network by a NOTIFY message from the DNS master server. The monitoring server may also initiate a complete zone transfer for other reasons, including: 1) a loss of configuration information on the monitoring server; 2) a loss of communications with more than a predetermined number of devices; 3) a DNS server which does not support incremental transfers; and 4) an addition of new monitoring zones.

Large network systems may use multiple monitoring servers, with each server responsible for some subset of devices in the system. DNS zones may be used to associate a subset of devices to a specific server. For example, the sub-domain bldg1.company.com may be associated with devices and the monitoring server in a first building, while the sub-domain bldg2.company.com may be associated with devices and the monitoring server in a second building. Devices may be assigned to a particular zone based on the structure of their IP address. For example, all devices in the first building may have an IP address structure of 10.168.85.3X. Alternately, devices may be assigned to a particular zone based on identification information the devices provide in the DHCP option fields (e.g., the VSO field).

Figure 2:
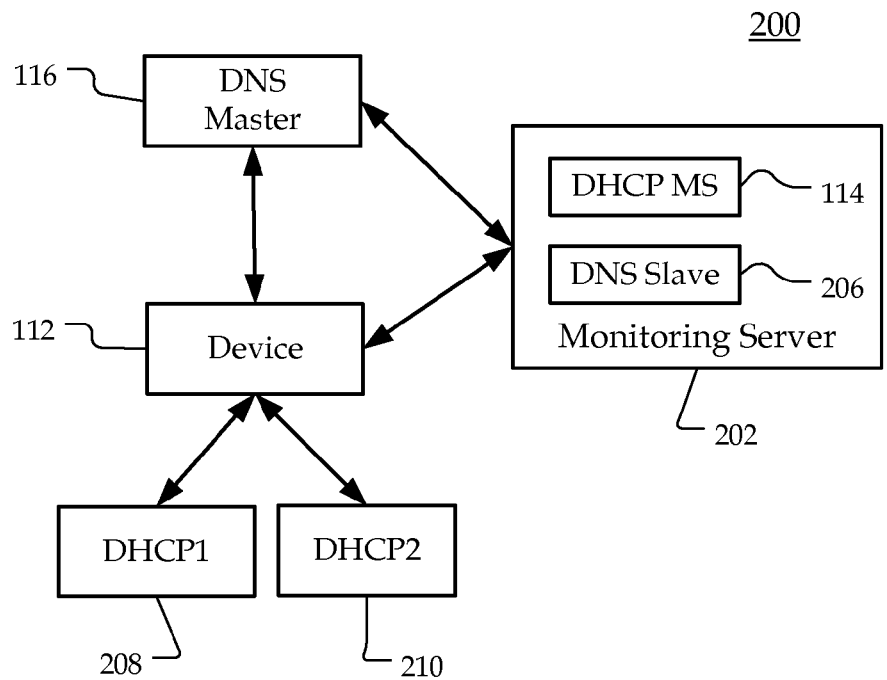
FIG. 2 is an alternate embodiment of a network management system.

FIG. 2 illustrates an alternate embodiment of a network management system 200. The system includes the DNS master 116 and the device 112, as well as multiple DHCP servers 208, 210. The monitoring server 202 in the network system 200 includes the DHCP server 114 (labeled DHCP (MS) in FIG. 2), and acts as a DNS slave 206. DHCP (MS) may indicate that the DHCP server is specialized for communication with the monitoring server (MS) while other DHCP servers may not be configured to analyze and interpret additional identification information to the monitoring server. As discussed below, FIG. 3 illustrates an exemplary process utilizing components from the network systems 100, 200.

The network system 200 illustrates multiple DHCP servers (DHCP1 208 and DHCP2 210) that communicate with the device 112. In one embodiment, the DHCP servers 208, 210 may be generic DHCP servers, while the DHCP server 114 may be a specialized DHCP server that receives additional identification information about devices on the network that can be used by the monitoring server 102 for tracking and monitoring the devices that are connected to the network. In one embodiment, the specialized DHCP server reads and interprets information in standard DHCP protocol fields that other DHCP servers may not know how to interpret. As discussed, the additional information is identification information from the DHCP option fields that identifies the device. The DHCP server 114 may be a specialized server that is specific to a certain network or specific to a monitoring server, such as the monitoring server 102. In alternative embodiments, the DHCP server 114 may be combined with other non-specialized DHCP servers, such as servers 208, 210.

The monitoring server 202 may be combined with the DHCP server 114 as a single component. Alternatively, as shown in FIG. 1, the DHCP server 114 and the monitoring server 102 may be different components. The monitoring server 202 may act as a DNS slave 206. In particular, the DNS master 116 sends a message to the DNS slaves to learn about changes in domains. Each of the devices on the network, such as the device 112, as well as the monitoring server 202 may be DNS slaves. In one example, when the device 112 is a gateway for other devices and operating as a slave DNS server, the gateway may directly represent attached serial slave devices as separate devices on the network. The representation may be within some sub-domain, such as "gateway.company.com".

Figure 3:
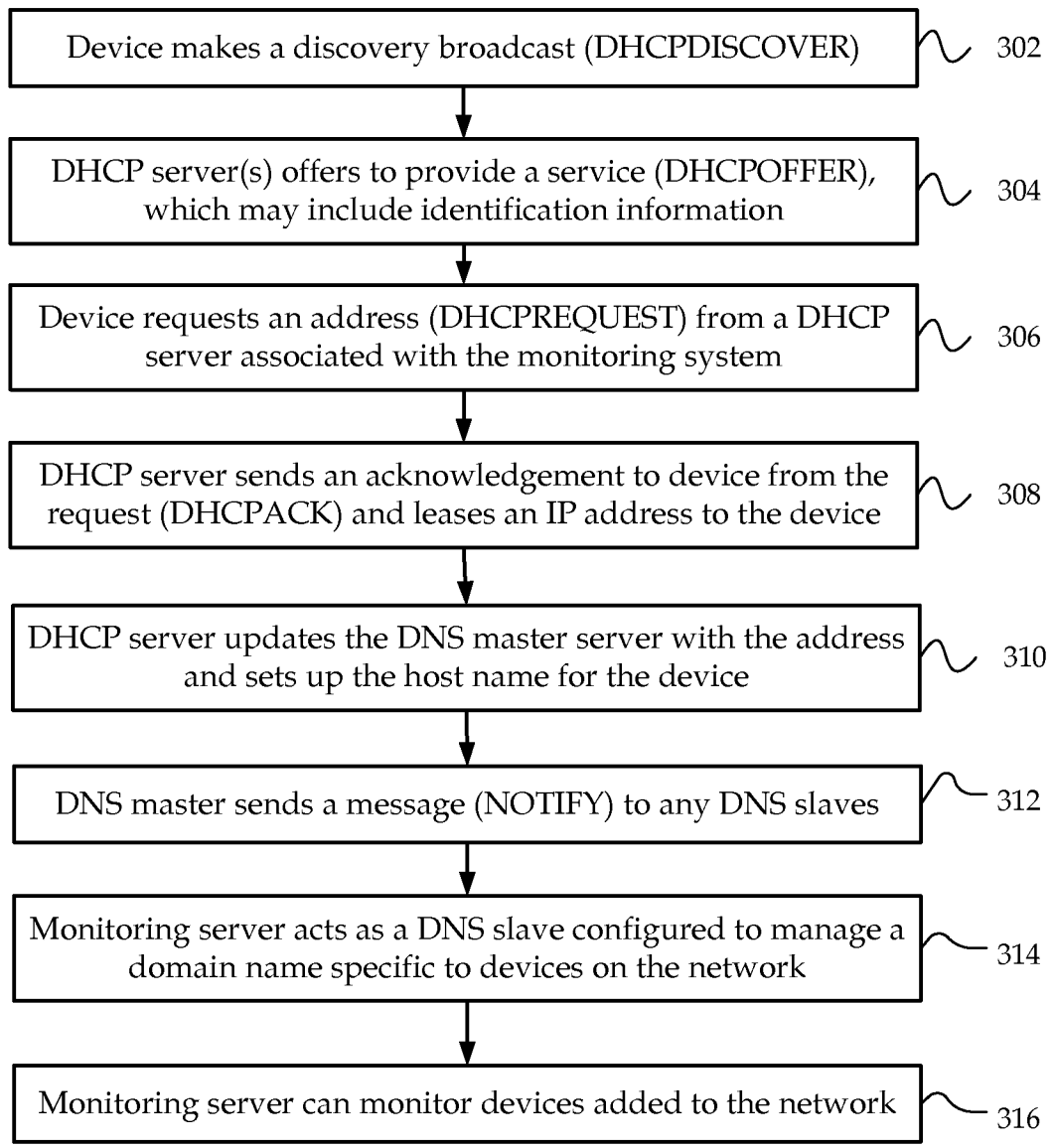
FIG. 3 is a process for automatically discovering devices on a network.

FIG. 3 is a process by which the monitoring server automatically discovers devices on the network. The process described in FIG. 3 may be performed by any of the embodiments shown in FIG. 1, 2, or 4. In particular, the process in FIG. 3 relates to interactions between a device (e.g. device 112), a monitoring server (e.g. monitoring server 102, 202), one or more DNS servers (e.g. DNS Master 116), and one or more DHCP servers (e.g. DHCP 114).

In block 302, the device 112 makes a discovery broadcast. The discovery broadcast may be a DHCPDISCOVER that is submitted to one or more DHCP servers. The broadcast may include identification information in the vendor-specific options (VSO) field (such as its serial number) that may be used later by a DHCP server specific to the monitoring server. The device may also use DHCP option fields—such as option 12 (host name)—for further identification. As described, the DHCP server may utilize the device identification information for discovering/identifying devices that are added to the network. When the hostname field is used for a device ID, generic DHCP and DNS servers may be used by the monitoring server to discover devices added to the network. When the VSO field is used for device ID, a generic DHCP server may need to be configured to process the VSO field (i.e. a DHCP server specific or specialized for the monitoring server).

The DHCPDISCOVER broadcast may go to multiple DHCP servers. In response to the DHCPDISCOVER broadcast, any of DHCP servers may offer to provide a service (DHCPOFFER) in block 304. As shown in FIG. 1, the DHCP server 114 may send a DHCPOFFER to the device 112. When multiple DHCP servers provide an offer in response to a discover broadcast, the DHCP server that is specialized or configured to communicate with the monitoring server may be chosen. In particular, the discover broadcast may include additional identification information that is identified by the specialized DHCP server that is looking for the additional identification information. Accordingly, the DHCP server 114 may include additional features specific to the monitoring system and/or the monitoring server 102 that look for the identification information that may be associated with a device. The DHCP server 114 may look for the identification information (such as in the VSO field) in DHCPDISCOVER broadcast before making a DHCPOFFER to the device 112. The DHCP server specific to the monitoring server may use the VSO field in the DHCPOFFER message to identify itself to monitoring devices.

Upon receiving offers from one or more DHCP servers, the device 112 may request an address with a DHCPREQUEST command in block 306. In one embodiment, the device 112 may make a determination as to whether any of the DHCP servers are associated with the monitoring system. As described, the DHCP server 114 is associated with the monitoring server 102. Accordingly, when the DHCP server 114 makes an offer to the device 112, the device requests an address from that server rather than other DHCP servers that are not associated with the monitoring system. A DHCP server that is associated with the monitoring system may include identification information in its messages and the determination may be based on an examination of the message to locate the identification information. For example, the determination may be based on an examination of the VSO field of the DHCPOFFER message received by the device 112 in response to its DHCPDISCOVER broadcast. Alternatively, another field or location may include identification data that is examined from the DHCPOFFER message.

When the request is sent to the DHCP server, the DHCP sends an acknowledgement to the device as in block 308. In particular, the DHCP server sends a DHCPACK command to the device and leases an IP address to the device. The acknowledgement from the DHCP server acknowledges the request from the device 112. The device may receive multiple offers from multiple DHCP servers, but may then send a single request to the chosen DHCP server, which then acknowledges the request. The chosen DHCP server may be the server that looks for and includes device identification information in its messages.

After the acknowledgement, the DHCP server has leased an IP address to the device. In block 310, the DHCP server then updates the DNS master 116 with the address and sets up the host name for the device. In particular, address record ("A") is updated in the DNS master 116 to reflect the host name for the device and the IP address for the device. The host name may be set up for the device based on the information received. For example, the fully qualified name may be based on a serial number or a model type for the device, as well as the company domain. For example, the host name may be SN12345.company.com, where SN12345 is the serial number for the device and the company's domain is company.com. Depending on the device, the DNS master 116 may also set the TXT record for the device to include information received, such as the serial number for the device. In one embodiment, the DNS Security Extensions (DNSSEC) may be used for this information exchange.

The DNS master may then send a notification command to any DNS slaves on the network as in block 312. The notification command may be a NOTIFY message that prompts the DNS slaves on the network to initiate an incremental zone transfer and refresh the changes in the zones being managed since the last zone transfer operation. When the master DNS server receives an update from the DHCP server (including new device on the network or devices with a changed IP address) it sends the NOTIFY command to slave DNS server(s) to let them know some change has occurred. The slave DNS servers can then request a transfer and receive the updated data themselves. For example, master DNS server 116 may receive an update from DHCP server 114, prompting master DNS server 116 to send a NOTIFY message. Upon receiving the NOTIFY message, slave DNS server 206 may initiate an incremental zone transfer.

In addition to the zone transfer, a monitoring server may query a DNS server directly and search for nodes or slaves with attributes unique to monitoring devices on the network. Some DNS servers can be configured to use database systems (e.g., SQL Server or MySQL), and these database systems may offer interfaces for direct queries. The monitoring server may search for domain names with a particular structure (e.g., all nodes with a sub-domain of bldg1.company.com), or for specific strings in one or more resource records (e.g., a TXT resource record identifying a node as particular type of device).

The monitoring server 102, 202 may act as a DNS slave within the network as in block 314. The monitoring server 102, 202 is configured to manage a domain name specific to certain devices on the network. For example, the monitoring server 102, 202 may be configured to manage the monitoring.company.com zone to learn of any devices added or removed from the network. The management of devices includes tracking the list of devices within the monitoring-specific sub-domain, and the creation of hostnames for devices. In one example, the monitoring server receives ID info for a new device from the DHCP VSO field (or DNS TXT record). As the authority for the "monitoring.company.com" sub-domain, the DNS server on the monitoring server may create the FQDN "SN123.monitoring.company.com" for a device with serial number SN123. Alternately, when a gateway also contains a DNS server, it may perform the same task for serial slave devices attached to it.

In block 316, the monitoring server 102, 202 detects devices added to the network and monitors devices removed from the network. In addition, the monitoring server 102, 202 has the information required to contact a device that is added to the network. The monitoring server 102, 202 has access to the IP address and host name for the device, as well as any additional information included in the TXT record for the device, such as a serial number.

Figure 4:
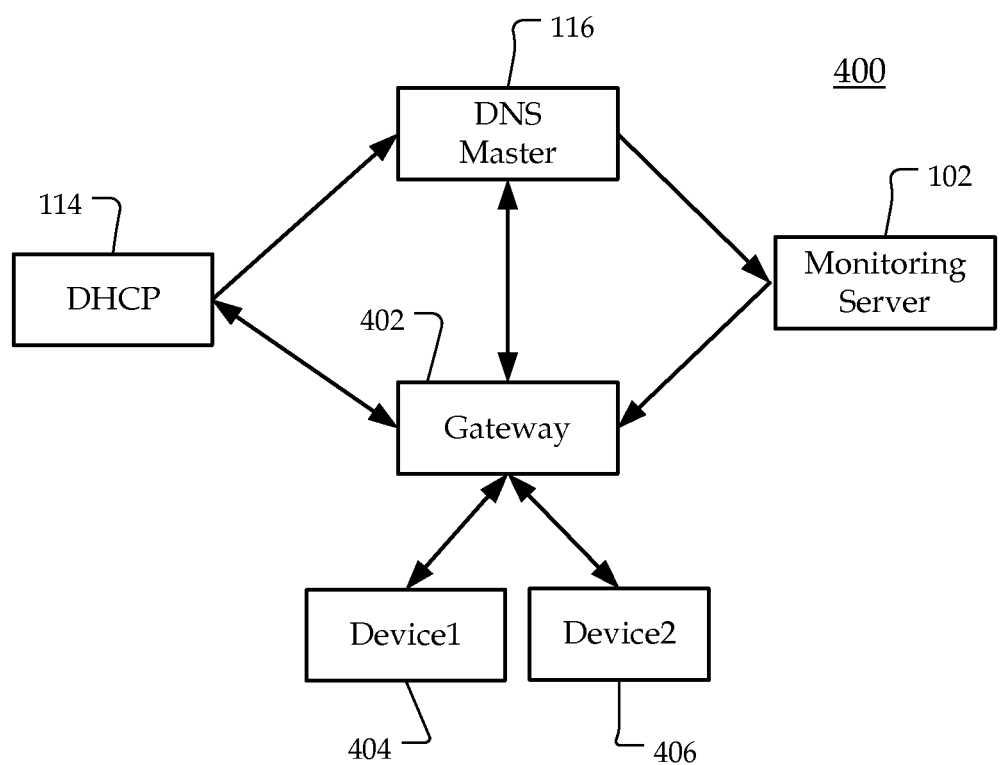
FIG. 4 is another alternate embodiment of a network management system.

FIG. 4 is another alternate embodiment of a network management system 400. In particular, the network system 400 illustrates a gateway or gateway device 402 within the network. The gateway 402 may couple multiple slave devices, such as device1 404 and device2 406, to the network. In alternative embodiments, each gateway may couple more or fewer slave devices to the network. A network may include multiple gateways coupling multiple slave devices to the network. As described above, the device 112 may be a gateway device with slave devices, or may be a slave device connected to the network through a gateway.

Some devices may be operative to directly connect with a TCP/IP network and directly support TCP/IP communications. Alternatively, certain devices may only connect to a TCP/IP network through a gateway device. As shown, the gateway 402 may connect directly to the TCP/IP network and support one or more slave devices (devices 404, 406) communicating on the TCP/IP network. For example, the gateway 402 may support the slave devices 404, 406 on a serial communications bus (such as an RS-485 serial bus). The gateway 402 may perform protocol translation between the serial port to the slave devices 404, 406 and the TCP/IP network. The gateway 402 may facilitate automatic discovery by the monitoring server 102 of slave devices attached to the gateway.

The gateway 402 may be identified in the VSO option field or another DHCP option field. The gateway 402 obtains an IP address and FQDN as with other devices, but may include additional identification information in one or more option fields. The information may simply signal to the monitoring server 102 that the gateway 402 has one or more slave devices 404, 406 attached to it. The monitoring server 102 can then communicate with the gateway 402 directly to gather more information about the attached slave devices 404, 406. Alternately, the additional information may include identification information for each attached slave devices 404, 406, such that the monitoring server 120 can begin communications with each of the slave devices 404, 406 based on the identification information provided by the gateway 402.

When the gateway 402 obtains an IP address and FQDN, it may register with the DNS master 116 as a slave DNS node. The gateway 402 may act as the name server for any attached slave devices 404, 406, and may create a FQDN "alias" for each of the attached slave devices 404, 406. For example, the gateway 402 may obtain an IP address and FQDN of gateway.company.com. The gateway 402 may then register with the DNS master 116 and create an FQDN alias for each of the slave devices 404, 406, using a unique host name and FQDN ending in gateway.company.com. For example, a slave device with a serial number of SN12345 attached to the gateway may have a FQDN of SN12345.gateway.company.com.

FIG. 5 is an alternative process for automatically discovering devices on a network. The process described in FIG. 5 may be performed by any of the embodiments shown in FIG. 1, 2, or 4. A device connects to a network and requests an IP address for identification. In block 502, the device receives an IP address for the network connection. The device then provides a DNS server with identification information in block 504. The identification information may include a device name, model, type, serial number, or other identifying label. The identification information that is provided to the DNS server may be used for identifying the device on the network. In particular, a monitoring server queries the DNS server to determine the devices that are connected as in block 506. The connected devices are identified based on the identification information rather than their IP address. The monitoring server may then compare the identified devices with a list of previously known devices. The list of previously identified devices may be updated with the newly identified devices in block 508. The monitoring server can probe the newly discovered devices for their identification information as in block 510. In particular, the identification information of the newly discovered devices may be recorded as part of the list of previously known devices. Accordingly, the next query of devices may identify those devices as previously known even if the IP address of the devices has changed.

A "computer-readable medium," "machine readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory. The term "computer-readable medium" shall also include any medium that is capable of storing, encoding or carrying a set of instructions for execution by a processor or that cause a computer system to perform any one or more of the methods or operations disclosed herein.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for discovering devices on a network comprising:
   one or more devices on the network that broadcast for access to the network, wherein the broadcast includes identification information for the broadcasting device;
   a dynamic network address assignment server that receives the broadcast and leases an address to the broadcasting device;
   a device address translator coupled with the dynamic network address assignment server that is updated with the leased address and assigns a host name to the device, wherein the host name includes the identification information and the identification information is different from the leased address; and
   a monitoring server communicating with the dynamic network address assignment server that discovers devices on the network based on the host name.

2. The system of claim 1 wherein the dynamic network address assignment server comprises a dynamic host configuration protocol (DHCP) server and the device address translator comprises a domain name system (DNS) server.

3. The system of claim 2 wherein the network comprises a TCP/IP network and the address comprises an IP address.

4. The system of claim 1 wherein leasing of the address further comprises:
   providing an offer message in response to the broadcast;
   receiving a request from the device, wherein the device sends the request to the monitoring server after locating the identification information; and
   providing an acknowledgement message acknowledging the lease of the IP address.

5. The system of claim 4 wherein the identification information is stored in an option field that is included in the broadcast and the offer message.

6. The system of claim 5 wherein the option field comprises a Vendor Specific Option (VSO) field or an option field for a host name.

7. The system of claim 5 wherein the identification information comprises a model, type, or serial number of the device.

8. The system of claim 1 wherein the one or more devices comprise intelligent electronic devices (IED's).

9. The system of claim 1 wherein one of the one or more devices comprises a gateway device that connects with other devices, and wherein the gateway device connects those other devices with the dynamic network address assignment server and the device address translator.

10. The system of claim 1 wherein the identification information comprises an identification for the device and an identification for the dynamic network address assignment server.

11. A method for automated monitoring of devices on a network comprising:
   receiving a request from a device to join the network, wherein the request includes identification information for the device;
   offering, upon receipt of the request, to connect the device to the network;
   acknowledging the connection of the device to the network;
   updating a device address translator based on the identification information from the device for associating a host name with the device, wherein the host name includes the identification information; and
   updating a list of devices on the network based on the identification information for the devices, wherein the list of devices on the network is used to identify the connected devices and is compared with a prior list of devices to determine which devices are newly connected.

12. The method of claim 11 further comprising:
   updating the list of devices on the network by comparing the identification information for previously identified devices with the identification information for newly identified devices on the network.

13. The method of claim 11 wherein the offering to connect comprises providing the device with a lease of an internet protocol (IP) address for the network.

14. The method of claim 11 wherein the identification information comprises a model, type, or serial number of the device.

* * * * *

UNITED STATES PATENT AND TRADEMARK OFFICE
CERTIFICATE OF CORRECTION

PATENT NO. : 8,977,738 B2  
APPLICATION NO. : 12/479265  
DATED : March 10, 2015  
INVENTOR(S) : Wilerson et al.

It is certified that error appears in the above-identified patent and that said Letters Patent is hereby corrected as shown below:

Title page

Under the Assignee (73):

"Power Measurement Ltd." should be deleted and replaced with
--Square D Company--.

Signed and Sealed this
Eighteenth Day of August, 2015

Michelle K. Lee
*Director of the United States Patent and Trademark Office*